A. P. ROSE.
Hames.

No. 202,376.  Patented April 16, 1878.

WITNESSES:
H. Rydquist
J. H. Scarborough

INVENTOR:
A. P. Rose
BY Munn & Co
ATTORNEYS.

N. PETERS, PHOTO-LITHOGRAPHER, WASHINGTON, D. C.

UNITED STATES PATENT OFFICE.

ALBERT P. ROSE, OF BEOWAWE, NEVADA, ASSIGNOR TO HIMSELF AND THOMAS BABINGTON, OF SAME PLACE.

IMPROVEMENT IN HAMES.

Specification forming part of Letters Patent No. 202,376, dated April 16, 1878; application filed June 25, 1877.

*To all whom it may concern:*

Figure 1:
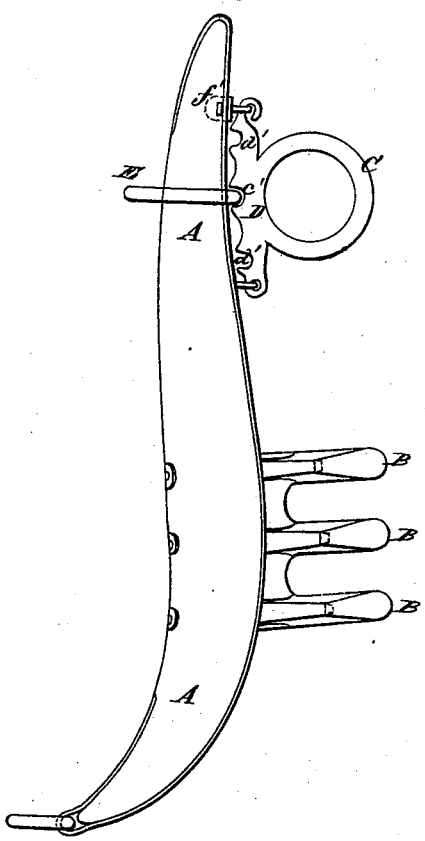
Figure 2:
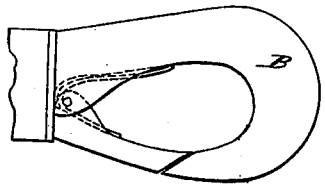
Figure 3:
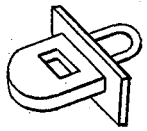

Be it known that I, ALBERT PULSON ROSE, of Beowawe, in the county of Eureka and State of Nevada, have invented a new and useful Improvement in Hames, of which the following is a specification:

Figure 1 is a front view of my improved hame. Fig. 2 is a detail top view of the snap-hook to receive the draft. Fig. 3 is a detail perspective view of the device for fastening the rim-ring bar.

Similar letters of reference indicate corresponding parts.

The object of this invention is to furnish improved hames, which shall be so constructed that the point of draft attachment may be varied as the size of the horse's neck or the condition of his shoulder may require, and that the upper hame-strap may be adjusted as the size of the horse's neck may require.

The invention will first be described in connection with the drawing, and then pointed out in the claim.

A represents one of the hames. B are the draft or hame-tug hooks, three of which are formed upon one base, which base is secured to the hame A by bolts, as shown in Fig. 1. The hooks B are made in the form of snap-hooks, to facilitate the shifting of the hame-tug or trace from one to another of said hooks, as circumstances may require.

The triple hook enables the point of draft attachment to be changed as the size of the horse's neck upon which the hame is to be used may require, and to relieve any part of the horse's shoulder that may be sore, so that the sore may heal while the horse is being worked.

C is the rim-ring, which is formed upon a long bar or base, D.

In the inner side of the base-bar D is formed a number of notches, $d'$, to receive the upper hame-strap ring or loop E.

The lower end of the base-bar D has an eye formed in it to receive the eye or hook bolt or staple attached to the hame A, to hinge the said bar to the said hame, so that the upper end of the bar may be swung outward to enable the hame-strap ring or loop E to be shifted from one to another of the notches $d'$, as the size of the horse's neck may require.

The upper end of the base-bar D has an eye or hook formed in it to receive the outer eye of the eye-block E, the inner eye of which is inserted in a socket in the hame A, where it is secured by a leather or other key, $f'$. The upper end of the base-bar D I prefer to secure by a spring-bolt or other conveniently-detached catch.

Having thus described my invention, I claim as new and desire to secure by Letters Patent—

The triple hook B, in combination with the hame A, to enable the point of draft attachment to be adjusted as required, substantially as herein shown and described.

ALBERT P. ROSE.

Witnesses:
 JOHN C. OWENS,
 OLIVER BENSON.